US009955453B2

(12) United States Patent
Rashid et al.

(10) Patent No.: US 9,955,453 B2
(45) Date of Patent: Apr. 24, 2018

(54) EVOLVED NODE-B, USER EQUIPMENT, AND METHODS FOR PAGING USING A BITMAP OF PAGING INDICATORS

(71) Applicant: Intel Corporation, Santa Clara, CA (US)

(72) Inventors: Mohammad Mamunur Rashid, Hillsboro, OR (US); Satish Chandra Jha, Hillsboro, OR (US); Tao Wu, San Jose, CA (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 85 days.

(21) Appl. No.: 14/834,963

(22) Filed: Aug. 25, 2015

(65) Prior Publication Data
US 2017/0064671 A1    Mar. 2, 2017

(51) Int. Cl.
*H04W 4/00* (2009.01)
*H04W 68/02* (2009.01)
*H04W 68/00* (2009.01)

(52) U.S. Cl.
CPC .......... *H04W 68/02* (2013.01); *H04W 4/005* (2013.01); *H04W 68/005* (2013.01)

(58) Field of Classification Search
CPC ................................................. H04W 68/005
USPC ........................................................ 370/328
See application file for complete search history.

(56) References Cited

U.S. PATENT DOCUMENTS

| 2004/0152476 A1* | 8/2004 | Kuwano ............... H04W 68/00 455/459 |
| 2006/0104225 A1* | 5/2006 | Kim ....................... H04L 12/189 370/313 |
| 2006/0116136 A1* | 6/2006 | Noma .................... H04W 68/00 455/458 |
| 2006/0251033 A1* | 11/2006 | Oprescu-Surcobe . H04W 68/02 370/338 |
| 2008/0182596 A1* | 7/2008 | Wang .................. H04W 68/025 455/458 |

(Continued)

FOREIGN PATENT DOCUMENTS

| WO | WO-2011108897 A2 | 9/2011 |
| WO | WO-2013051898 A2 | 4/2013 |

OTHER PUBLICATIONS

"International Application Serial No. PCT/US2016/042140, International Search Report dated Oct. 24, 2016", 4 pgs.

(Continued)

*Primary Examiner* — Wutchung Chu
*Assistant Examiner* — Berhanu Belete
(74) *Attorney, Agent, or Firm* — Schwegman Lundberg & Woessner, P.A.

(57) ABSTRACT

Embodiments of an Evolved Node-B (eNB), User Equipment (UE), and methods for paging are disclosed herein. The eNB may transmit a paging message that may include paging identifiers to indicate an intention of the eNB to send downlink data to the first group of UEs. The paging message may further include a bitmap of paging indicators to indicate whether the eNB intends to send downlink data to a second group of UEs. The paging message may include the bitmap when a length of the bitmap is less than a combined length of paging identifiers for a paging portion of second group of UEs to which the eNB intends to send downlink data.

22 Claims, 8 Drawing Sheets

(56) References Cited

U.S. PATENT DOCUMENTS

| | | | | |
|---|---|---|---|---|
| 2009/0303953 | A1* | 12/2009 | Kang | H04W 68/025 370/329 |
| 2010/0173651 | A1* | 7/2010 | Park | H04W 68/02 455/458 |
| 2010/0272037 | A1* | 10/2010 | Lee | H04W 52/0235 370/329 |
| 2011/0003603 | A1* | 1/2011 | Park | H04W 68/02 455/458 |
| 2011/0051668 | A1* | 3/2011 | Lee | H04W 68/02 370/328 |
| 2011/0134893 | A1* | 6/2011 | Park | H04W 68/02 370/336 |
| 2012/0263106 | A1* | 10/2012 | Lee | H04W 4/005 370/328 |
| 2012/0327856 | A1* | 12/2012 | Jung | H04W 68/005 370/328 |
| 2013/0029697 | A1* | 1/2013 | Jung | H04W 68/00 455/458 |
| 2013/0034059 | A1* | 2/2013 | Lee | H04W 74/006 370/328 |
| 2013/0107778 | A1* | 5/2013 | Ryu | H04W 48/02 370/311 |
| 2013/0115977 | A1* | 5/2013 | Chandramouli | H04W 68/00 455/458 |
| 2013/0279405 | A1* | 10/2013 | Jafarian | H04W 68/02 370/328 |
| 2013/0294281 | A1* | 11/2013 | Lee | H04W 24/10 370/252 |
| 2013/0310016 | A1* | 11/2013 | Park | H04W 28/18 455/418 |
| 2014/0092801 | A1* | 4/2014 | Kim | H04L 12/1877 370/312 |
| 2014/0171061 | A1* | 6/2014 | Larmo | H04W 74/006 455/422.1 |
| 2015/0189574 | A1* | 7/2015 | Ng | H04W 24/08 370/252 |
| 2016/0057738 | A1* | 2/2016 | Lee | H04W 52/0216 370/329 |
| 2016/0338006 | A1* | 11/2016 | Lee | H04W 52/0229 |

OTHER PUBLICATIONS

"International Application Serial No. PCT/US2016/042140, Written Opinion dated Oct. 24, 2016", 7 pgs.

* cited by examiner

EVOLVED NODE-B, USER EQUIPMENT, AND METHODS FOR PAGING USING A BITMAP OF PAGING INDICATORS

TECHNICAL FIELD

Embodiments pertain to wireless communications. Some embodiments relate to cellular communication networks including 3GPP (Third Generation Partnership Project) networks, 3GPP LTE (Long Term Evolution) networks, and 3GPP LTE-A (LTE Advanced) networks, although the scope of the embodiments is not limited in this respect. Some embodiments relate to paging of mobile devices. Some embodiments relate to Machine Type Communication (MTC) operation. Some embodiments relate to Internet of Things (IoT) operation.

BACKGROUND

Base stations and mobile devices operating in a cellular network may exchange data and related control messages. In an example scenario, the network may support operation according to Machine Type Communication (MTC) or Internet of Things (IoT) protocols or techniques. As the number of such MTC or IoT devices may be large, in some cases, the exchanging of data and control information between the base station and the mobile devices may be challenging. Accordingly, there is a general need for methods and systems of exchanging data and control information in these and other scenarios.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
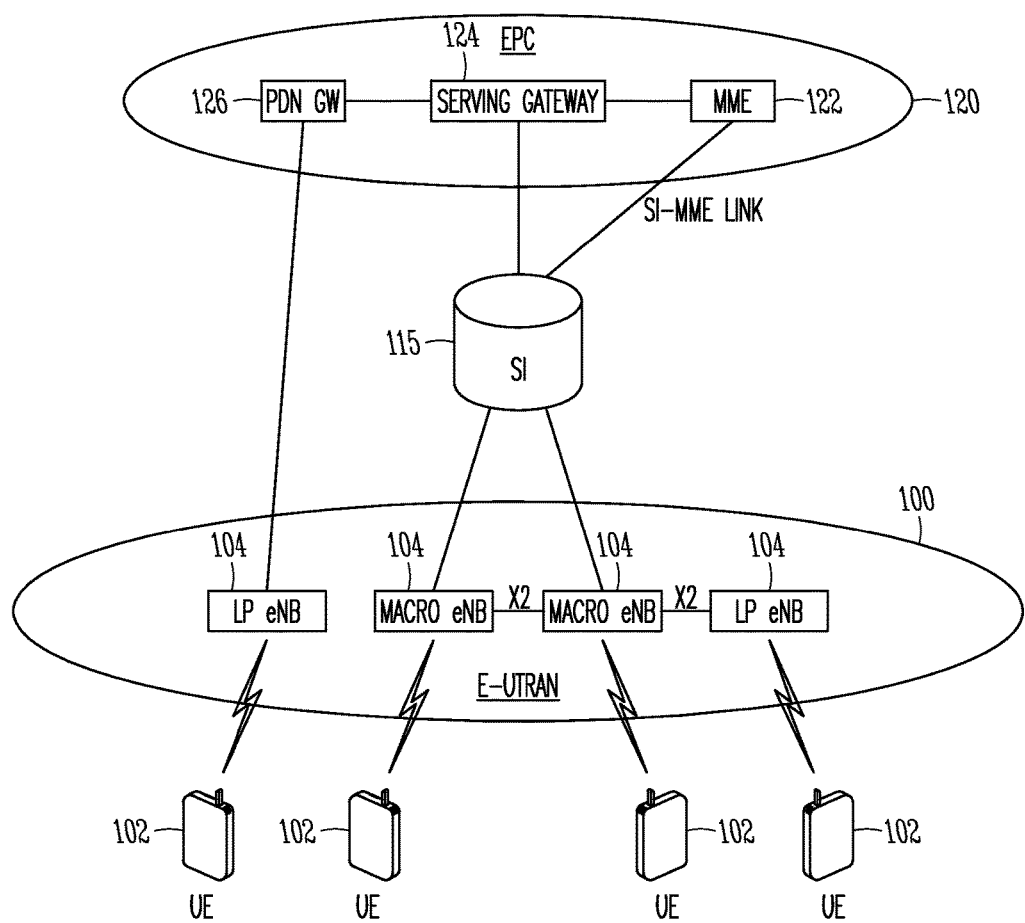
FIG. 1 is a functional diagram of a 3GPP network in accordance with some embodiments.

FIG. 1 is a functional diagram of a 3GPP network in accordance with some embodiments. The network comprises a radio access network (RAN) (e.g., as depicted, the E-UTRAN or evolved universal terrestrial radio access network) 100 and the core network 120 (e.g., shown as an evolved packet core (EPC)) coupled together through an S1 interface 115. For convenience and brevity sake, only a portion of the core network 120, as well as the RAN 100, is shown.

The core network 120 includes a mobility management entity (MME) 122, a serving gateway (serving GW) 124, and packet data network gateway (PDN GW) 126. The RAN 100 includes Evolved Node-B's (eNBs) 104 (which may operate as base stations) for communicating with User Equipment (UE) 102. The eNBs 104 may include macro eNBs and low power (LP) eNBs. In accordance with some embodiments, the eNB 104 may transmit a paging message that may include paging identifiers and/or a bitmap of paging indicators to indicate an intention of the eNB 104 to send downlink data to one or more UEs 102. The eNB 104 may also transmit downlink data to the UEs 102. These embodiments are described in more detail below.

The MME 122 is similar in function to the control plane of legacy Serving GPRS Support Nodes (SGSN). The MME 122 manages mobility aspects in access such as gateway selection and tracking area list management. The serving GW 124 terminates the interface toward the RAN 100, and routes data packets between the RAN 100 and the core network 120. In addition, it may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes. The PDN GW 126 terminates an SGi interface toward the packet data network (PDN). The PDN GW 126 routes data packets between the EPC 120 and the external PDN, and may be a key node for policy enforcement and charging data collection. It may also provide an anchor point for mobility with non-LTE accesses. The external PDN can be any kind of IP network, as well as an IP Multimedia Subsystem (IMS) domain. The PDN GW 126 and the serving GW 124 may be implemented in one physical node or separated physical nodes.

The eNBs 104 (macro and micro) terminate the air interface protocol and may be the first point of contact for a UE 102. In some embodiments, an eNB 104 may fulfill various logical functions for the RAN 100 including but not limited to RNC (radio network controller functions) such as radio bearer management, uplink and downlink dynamic radio resource management and data packet scheduling, and mobility management. In accordance with embodiments, UEs 102 may be configured to communicate Orthogonal Frequency Division Multiplexing (OFDM) communication signals with an eNB 104 over a multicarrier communication channel in accordance with an Orthogonal Frequency Division Multiple Access (OFDMA) communication technique. The OFDM signals may comprise a plurality of orthogonal subcarriers.

The S1 interface 115 is the interface that separates the RAN 100 and the EPC 120. It is split into two parts: the S1-U, which carries traffic data between the eNBs 104 and the serving GW 124, and the S1-MME, which is a signaling interface between the eNBs 104 and the MME 122. The X2 interface is the interface between eNBs 104. The X2 interface comprises two parts, the X2-C and X2-U. The X2-C is the control plane interface between the eNBs 104, while the X2-U is the user plane interface between the eNBs 104.

With cellular networks, LP cells are typically used to extend coverage to indoor areas where outdoor signals do not reach well, or to add network capacity in areas with very dense phone usage, such as train stations. As used herein, the term low power (LP) eNB refers to any suitable relatively low power eNB for implementing a narrower cell (narrower than a macro cell) such as a femtocell, a picocell, or a micro cell. Femtocell eNBs are typically provided by a mobile network operator to its residential or enterprise customers. A femtocell is typically the size of a residential gateway or smaller and generally connects to the user's broadband line. Once plugged in, the femtocell connects to the mobile operator's mobile network and provides extra coverage in a range of typically 30 to 50 meters for residential femtocells. Thus, a LP eNB might be a femtocell eNB since it is coupled through the PDN GW 126. Similarly, a picocell is a wireless communication system typically covering a small area, such as in-building (offices, shopping malls, train stations, etc.), or more recently in-aircraft. A picocell eNB can generally connect through the X2 link to another eNB such as a macro eNB through its base station controller (BSC) functionality. Thus, LP eNB may be implemented with a picocell eNB since it is coupled to a macro eNB via an X2 interface. Picocell eNBs or other LP eNBs may incorporate some or all functionality of a macro eNB. In some cases, this may be referred to as an access point base station or enterprise femtocell.

In some embodiments, a downlink resource grid may be used for downlink transmissions from an eNB 104 to a UE 102, while uplink transmission from the UE 102 to the eNB 104 may utilize similar techniques. The grid may be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid correspond to one OFDM symbol and one OFDM subcarrier, respectively. The duration of the resource grid in the time domain corresponds to one slot in a radio frame. The smallest time-frequency unit in a resource grid is denoted as a resource element (RE). Each resource grid comprises a number of resource blocks (RBs), which describe the mapping of certain physical channels to resource elements. Each resource block comprises a collection of resource elements and in the frequency domain and may represent the smallest quanta of resources that currently can be allocated. There are several different physical downlink channels that are conveyed using such resource blocks.

The physical downlink shared channel (PDSCH) carries user data and higher-layer signaling to a UE 102 (FIG. 1). The physical downlink control channel (PDCCH) carries information about the transport format and resource allocations related to the PDSCH channel, among other things. It also informs the UE 102 about the transport format, resource allocation, and HARQ information related to the uplink shared channel. Typically, downlink scheduling (assigning control and shared channel resource blocks to UEs 102 within a cell) is performed at the eNB 104 based on channel quality information fed back from the UEs 102 to the eNB 104, and then the downlink resource assignment information is sent to a UE 102 on the control channel (PDCCH) used for (assigned to) the UE 102.

The PDCCH uses CCEs (control channel elements) to convey the control information. Before being mapped to resource elements, the PDCCH complex-valued symbols are first organized into quadruplets, which are then permuted using a sub-block inter-leaver for rate matching. Each PDCCH is transmitted using one or more of these control channel elements (CCEs), where each CCE corresponds to nine sets of four physical resource elements known as resource element groups (REGs). Four QPSK symbols are mapped to each REG. The PDCCH can be transmitted using one or more CCEs, depending on the size of DCI and the channel condition. There may be four or more different PDCCH formats defined in LTE with different numbers of CCEs (e.g., aggregation level, L=1, 2, 4, or 8).

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
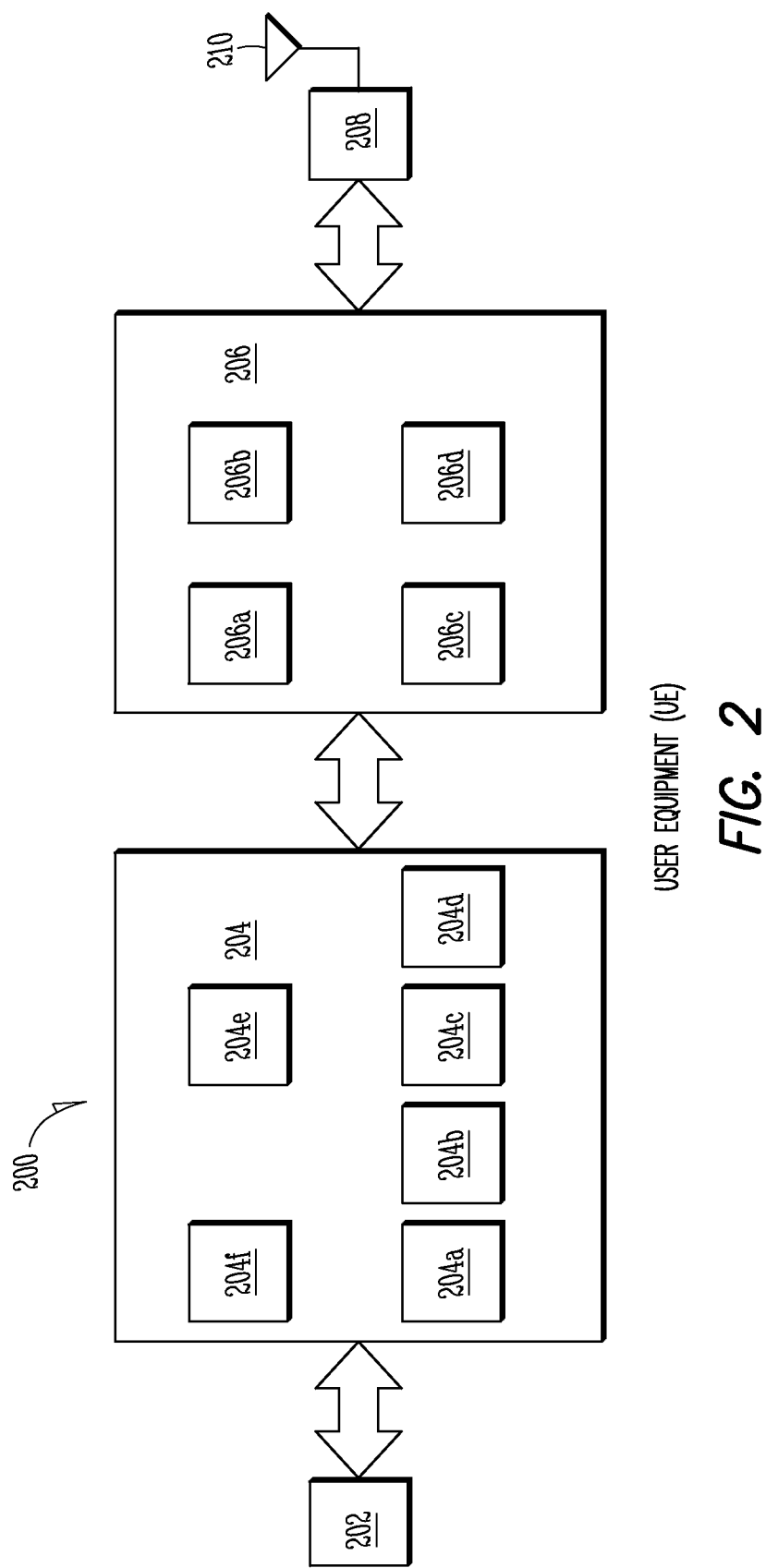
FIG. 2 is a functional diagram of a User Equipment (UE) in accordance with some embodiments.

FIG. 2 is a functional diagram of a User Equipment (UE) in accordance with some embodiments. The UE 200 may be suitable for use as a UE 102 as depicted in FIG. 1. In some embodiments, the UE 200 may include application circuitry 202, baseband circuitry 204, Radio Frequency (RF) circuitry 206, front-end module (FEM) circuitry 208 and one or more antennas 210, coupled together at least as shown. In some embodiments, other circuitry or arrangements may include one or more elements and/or components of the application circuitry 202, the baseband circuitry 204, the RF circuitry 206 and/or the FEM circuitry 208, and may also include other elements and/or components in some cases. As an example, "processing circuitry" may include one or more elements and/or components, some or all of which may be included in the application circuitry 202 and/or the baseband circuitry 204. As another example, "transceiver circuitry" may include one or more elements and/or components, some or all of which may be included in the RF circuitry 206 and/or the FEM circuitry 208. These examples are not limiting, however, as the processing circuitry and/or the transceiver circuitry may also include other elements and/or components in some cases.

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204*a*, third generation (3G) baseband processor 204*b*, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect. In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206. In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider. The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer. In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210. In some embodiments, the UE 200 may include additional elements such as, for example, memory/storage, display, camera, sensor, and/or input/output (I/O) interface.

Figure 3:
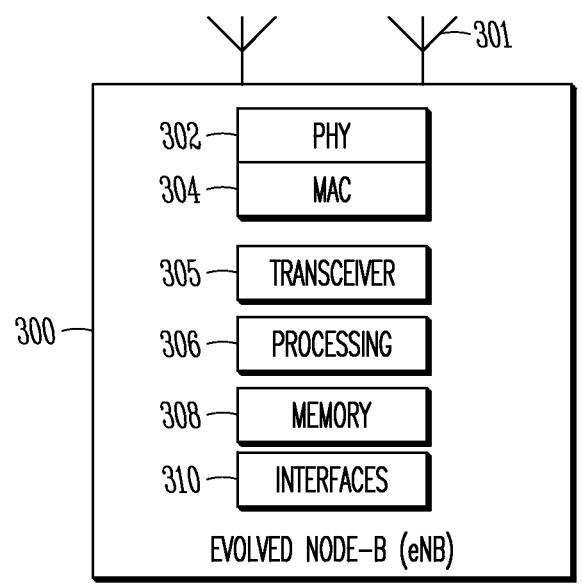
FIG. 3 is a functional diagram of an Evolved Node-B (eNB) in accordance with some embodiments.

FIG. 3 is a functional diagram of an Evolved Node-B (eNB) in accordance with some embodiments. It should be noted that in some embodiments, the eNB 300 may be a stationary non-mobile device. The eNB 300 may be suitable for use as an eNB 104 as depicted in FIG. 1. The eNB 300 may include physical layer circuitry 302 and a transceiver 305, one or both of which may enable transmission and reception of signals to and from the UE 200, other eNBs, other UEs or other devices using one or more antennas 301. As an example, the physical layer circuitry 302 may perform various encoding and decoding functions that may include formation of baseband signals for transmission and decoding of received signals. As another example, the transceiver 305 may perform various transmission and reception functions such as conversion of signals between a baseband range and a Radio Frequency (RF) range. Accordingly, the physical layer circuitry 302 and the transceiver 305 may be separate components or may be part of a combined component. In addition, some of the functionality described may be performed by a combination that may include one, any or all of the physical layer circuitry 302, the transceiver 305, and other components or layers. The eNB 300 may also include medium access control layer (MAC) circuitry 304 for controlling access to the wireless medium. The eNB 300 may also include processing circuitry 306 and memory 308 arranged to perform the operations described herein. The eNB 300 may also include one or more interfaces 310, which may enable communication with other components, including other eNBs 104 (FIG. 1), components in the EPC 120 (FIG. 1) or other network components. In addition, the interfaces 310 may enable communication with other components that may not be shown in FIG. 1, including components external to the network. The interfaces 310 may be wired or wireless or a combination thereof.

The antennas 210, 301 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210, 301 may be effectively separated to take advantage of spatial diversity and the different channel characteristics that may result.

In some embodiments, the UE 200 or the eNB 300 may be a mobile device and may be a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a wearable device such as a medical device (e.g., a heart rate monitor, a blood pressure monitor, etc.), or other device that may receive and/or transmit information wirelessly. In some embodiments, the UE 200 or eNB 300 may be configured to operate in accordance with 3GPP standards, although the scope of the embodiments is not limited in this respect. Mobile devices or other devices in some embodiments may be configured to operate according to other protocols or standards, including IEEE 802.11 or other IEEE standards. In some embodiments, the UE 200, eNB 300 or other device may include one or more of a keyboard, a display, a non-volatile memory port, multiple antennas, a graphics processor, an application processor, speakers, and other mobile device elements. The display may be an LCD screen including a touch screen.

Although the UE 200 and the eNB 300 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus used by the UE 200 and/or eNB 300 may include various components of the UE 200 and/or eNB 300 as shown in FIGS. 2-3. Accordingly, techniques and operations described herein that refer to the UE 200 (or 102) may be applicable to an apparatus for a UE. In addition, techniques and operations described herein that refer to the eNB 300 (or 104) may be applicable to an apparatus for an eNB.

In accordance with embodiments, the eNB 104 may transmit a paging message that may include paging identifiers to indicate an intention of the eNB 104 to send downlink data to the first group of UEs 102. The paging message may further include a bitmap of paging indicators to indicate whether the eNB 104 intends to send downlink data to a second group of UEs 102. The paging message may include the bitmap when a length of the bitmap is less than a combined length of paging identifiers for a paging portion of second group of UEs 102 to which the eNB 104 intends to send downlink data. The eNB 104 may also transmit downlink data to the UEs 102. These embodiments are described in more detail below.

Figure 4:
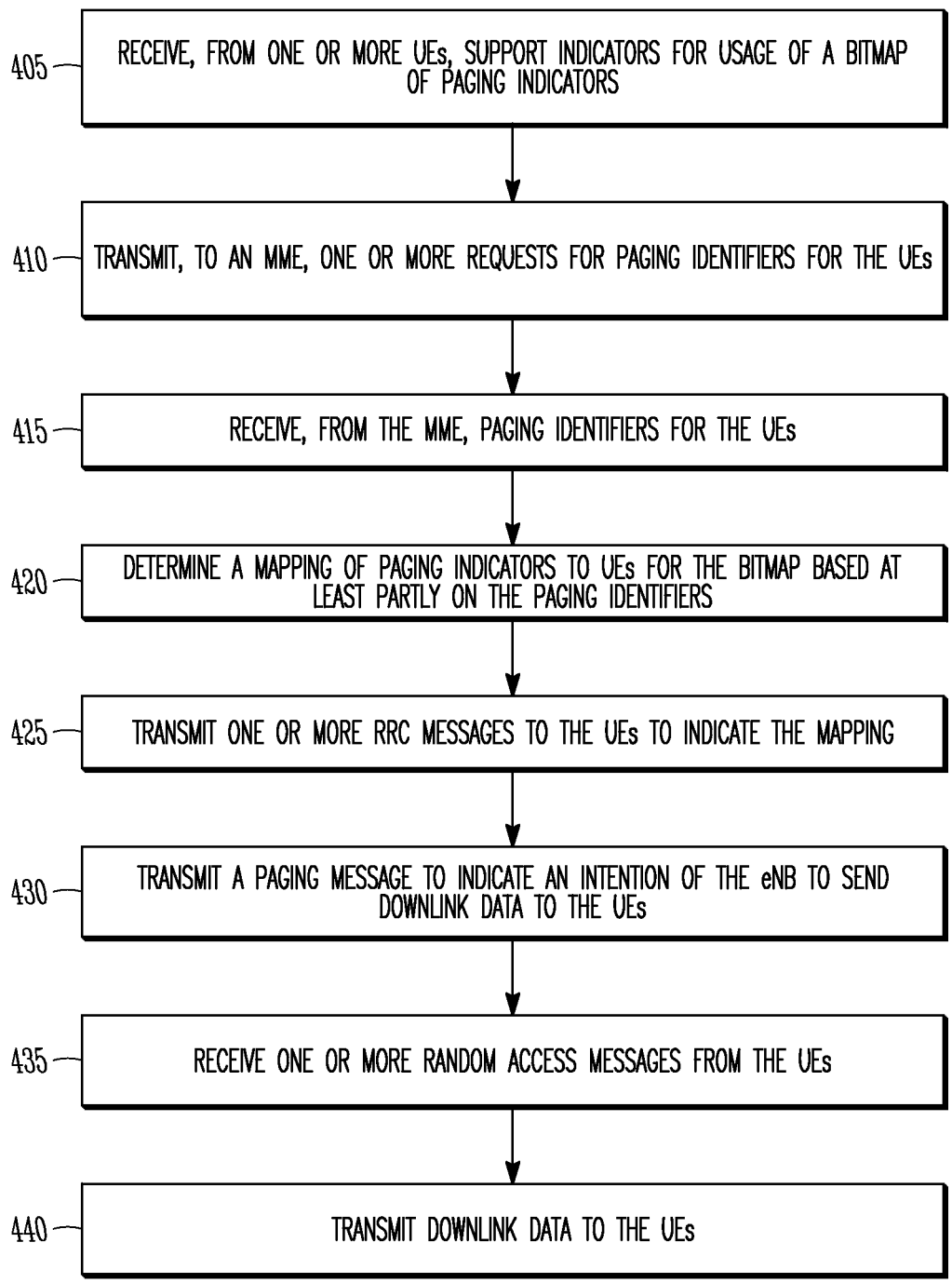
FIG. 4 illustrates the operation of a method of paging in accordance with some embodiments.

FIG. 4 illustrates the operation of a method of paging in accordance with some embodiments. It is important to note that embodiments of the method 400 may include additional or even fewer operations or processes in comparison to what is illustrated in FIG. 4. In addition, embodiments of the method 400 are not necessarily limited to the chronological order that is shown in FIG. 4. In describing the method 400, reference may be made to FIGS. 1-3 and 5-9, although it is understood that the method 400 may be practiced with any other suitable systems, interfaces and components.

In addition, while the method 400 and other methods described herein may refer to eNBs 104 or UEs 102 operating in accordance with 3GPP or other standards, embodiments of those methods are not limited to just those eNBs 104 or UEs 102 and may also be practiced by other mobile devices, such as a Wi-Fi access point (AP) or user station (STA). In addition, the method 400 and other methods described herein may be practiced by wireless devices configured to operate in other suitable types of wireless communication systems, including systems configured to operate according to various IEEE standards such as IEEE 802.11. The method 400 and other methods described herein may also be applicable to an apparatus for a UE 102 and/or eNB 104 or other device described above.

At operation 405 of the method 400, the eNB 104 may receive, from one or more UEs 102, support indicators for usage of a bitmap of paging indicators as part of paging by the eNB 104. That is, a support indicator from a particular UE 102 may indicate whether the UE 102 supports the usage of the bitmap or whether the UE 102 supports operation according to the bitmap. As an example, the UE 102 may include such support indicators in one or more radio resource control (RRC) messages or other messages. The message(s) may be transmitted to the eNB 104 during a UE capability information exchange during an initial attach process, in some cases. This example is not limiting, however, as other messages or techniques may be used by the UE 102 to communicate the support indicators to the eNB 104.

At operation 410, the eNB 104 may transmit, to the mobility management entity (MME) 122, one or more requests for paging identifiers for one or more UEs 102. As an example, the requests may be for paging identifiers for UEs 102 that have indicated support for the usage of the bitmap of paging indicators. As another example, the eNB 104 may request paging identifiers for a portion of those UEs 102 that have indicated support for the usage of the bitmap of paging indicators. These examples are not limiting, however, as the eNB 104 may also request paging identifiers for other UEs 102 that may or may not have indicated such support, in some cases.

It should be noted that paging identifiers used in the method 400 and other methods described herein may include any suitable numerical identifier or other parameter to identify the UE 102. As an example, a temporary mobile subscriber identity (TMSI), such as a system architecture evolution TMSI (S-TMSI) or other TMSI, may be used. As another example, an international mobile subscriber identity (IMSI) may be used. These examples are not limiting, however, as the paging identifiers may include other identifiers that may or may not be part of a standard such as 3GPP, IEEE 802.11 or others.

At operation 415, the eNB 104 may receive, from the MME 122, paging identifiers for one or more UEs 102. As an example, the eNB 104 may receive paging identifiers for the UEs 102 as requested by the eNB 104 at operation 410 or other operation. As another example, the MME 122 may not send paging identifiers for all the UEs 102 as requested by the eNB 104, and may send a portion of them. These examples are not limiting, however, as the eNB 104 may also receive paging identifiers for other UEs 102 that may or may not have been indicated by the eNB 104 as part of request operations such as 410 or others.

At operation 420, a mapping of paging indicators to UEs 102 for the bitmap may be determined by the eNB 104. The mapping may be based at least partly on one or more factors, such as paging identifiers for the UEs 102, support indicators received from the UEs 102 or other factors. As a non-limiting example, paging indicators may be mapped to UEs 102 that have indicated support for usage of the bitmap of mapping indicators in RRC messages or other messages.

As another non-limiting example, a paging opportunity (PO) or similar technique may be used to accommodate paging of multiple groups of UEs 102 by the eNB 104 during multiple time periods. For instance, the eNB 104 may be able to page a first group of UEs 102 during a first PO and a second group of UEs 102 during a second PO. The UEs 102 included in each group may be determined (by both the UE 102 and the eNB 104) based on the paging identifier of the UE 102 and/or other factors.

Accordingly, the eNB 104 may determine, as part of operation 420, a group of UEs 102 that may be assigned to a particular PO based on paging identifiers of the UEs 102. The eNB 104 may then determine a mapping for a bitmap to be used during the PO. The mapping may be based on which UEs 102 (of the group of UEs 102 assigned to the PO) support the usage of the bitmap.

It should be noted that in some cases, the eNB 104 may determine a bitmap to be used during each of multiple POs. For instance, the UEs 102 supported by the eNB 104 may be divided into multiple groups corresponding to different POs. The eNB 104 may determine a bitmap for each PO based on the group of UEs 102 assigned to the PO. The eNB 104 may transmit one or more paging messages (to be described below) for each PO to page at least a portion of the group of UEs 102 assigned to the PO.

At operation 425, one or more messages may be transmitted by the eNB 104 to one or more UEs 102 to indicate the mapping of paging indicators to UEs 102 for the bitmap. As a non-limiting example, RRC messages or other control messages may be used. As described previously, multiple bitmaps may be used for multiple POs, in some cases. Accordingly, the messages transmitted by the eNB 104 may indicate mappings for the multiple bitmaps in such cases.

At operation 430, the eNB 104 may transmit a paging message for paging of one or more UEs 102. The paging of the UEs 102 may indicate an intention of the eNB 104 to send (or transmit) downlink data to the UEs 102, in some cases. As an example, the paging message may be for a transmission period during which the downlink data is to be sent to the UEs 102. As another example, such a transmission may be performed, in some cases, after a random access procedure has been performed for the UE 102, although embodiments are not so limited.

In some embodiments, the paging message may include paging identifiers for a first group of one or more UEs 102 for paging of the UEs 102. Although not limited as such, the paging identifiers may be included in a paging list, a paging record list or a similar list or group, which may or may not be included in a standard such as 3GPP, IEEE 802.11 or other standard. As an example, the paging identifiers may include one or more IMSI, TMSI, S-TMSI or other identifiers for the UEs 102 in the first group.

In some embodiments, the paging message may further include a bitmap of paging indicators. The paging indicators may be mapped to a second group of UEs 102 according to bit indexes of the bitmap. In some embodiments, the bitmap may exclude paging identifiers (such as the IMSI or S-TMSI previously described or others) for the second group of UEs 102. Accordingly, a particular bit of the bitmap that is mapped to a particular UE 102 may be used to page the UE 102. As an example, the bit may take values such as 0/1, yes/no or similar to indicate whether or not the UE 102 is paged by the paging message. It should be noted that although the example bitmap uses one bit per UE 102, embodiments are not limited to the use of one bit per UE 102.

In some embodiments, the paging message may exclude paging identifiers (such as the IMSI or S-TMSI or others) for the second group of UEs 102. The indication of whether or not a UE 102 in the second group of UEs 102 is paged may therefore be performed by setting of an appropriate bit in the bitmap. As an example, some or all of the UEs 102 in the second group of UEs 102 may be paged by setting the paging indicators mapped to those UEs 102 to a value of "1" and setting the remaining paging indicators to a value of "0." As another example, the paging indicators may all be set to a value of "0" to indicate that none of the UEs 102 in the second group of UEs 102 are being paged by the paging message.

In some embodiments, the paging message may further include a bitmap usage indicator that may indicate whether the bitmap of paging indicators is included in the paging message. As an example, a bit that may take values such as 0/1, yes/no or similar may be used. As another example, the bitmap usage indicator may be included when the bitmap is included in the paging message and may be excluded when the bitmap is excluded from the paging message. Embodiments are not limited to these examples, however, as other suitable techniques may be used to communicate to the UEs 102 that the bitmap is included and/or excluded from the paging message.

Figure 5:
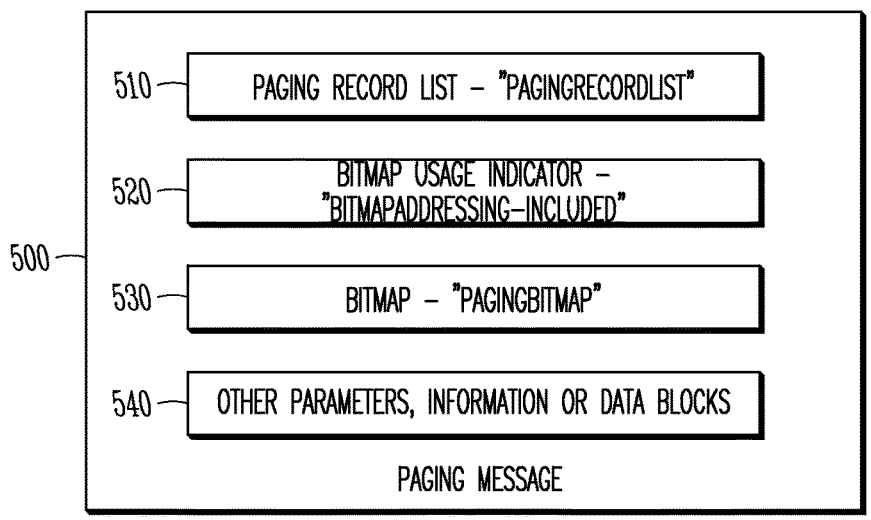
FIG. 5 illustrates an example of a paging message in accordance with some embodiments.

FIG. 5 illustrates an example of a paging message in accordance with some embodiments. The example paging message 500 shown in FIG. 5 may illustrate concepts associated with the method 400 or other methods, but the scope of the embodiments is not limited by this example. In addition, formats and arrangements of the message and parameters as shown in FIG. 5 are also not limiting. Some embodiments of the paging message 500 may include any or all of the parameters shown in FIG. 5. In some embodiments, the paging message 500 may also include other similar parameters in addition to, or instead of, some of those parameters shown in FIG. 5.

The paging message 500 may include the paging record list 510, which may include one or more paging identifiers such as those previously described or others. As an example, the paging record list 510 may be referred to as a "pagingRecordList" parameter or similar in some cases.

The paging message 500 may also include the bitmap usage indicator 520, which may indicate whether or not the paging message 500 includes a bitmap of paging indicators. As an example, the bitmap usage indicator 520 may be referred to as a "bitmapAddressing—Included" or similar in some cases.

The paging message 500 may also include the bitmap 530 of paging indicators, which may indicate whether or not UEs 102 mapped to bit indexes of the bitmap are paged by the paging message 500. As an example, the bitmap 530 may be referred to as a "pagingBitmap" or similar in some cases.

The paging message 500 may also include any number (including zero) of other parameters, information or data blocks 540, which may or may not be related to paging or to techniques and operations described herein.

In some embodiments, the paging message may be formatted according to any number of factors. Such factors may include a number of UEs 102 that may be paged via paging identifiers, a number of UEs 102 that may be paged via the bitmap of paging indicators, a paging identifier length, a bitmap length or other factors. As an example, the paging identifiers may include a relatively large number of bits, such as 40 bits for an S-TMSI and 64 bits for an IMSI. In contrast, the bitmap may use one bit for paging of each UE 102 that is mapped to the bitmap. A benefit in system efficiency and/or throughput may be realized, in some cases, through formatting of the paging message. For instance, the eNB 104 may select a paging message format in order to reduce an overall length of the paging message.

As an example, the eNB 104 may wish to page a first group of UEs 102 using paging identifiers and may use a bitmap of paging indicators for paging one or more UEs 102 in a second group of UEs 102. In some cases, usage of the bitmap for paging of UEs 102 in the second group may be more efficient than usage of paging identifiers for them. For instance, paging of a large number of UEs 102 in the second group may be performed more efficiently using the bitmap in some cases.

However, in other cases it may be more efficient for the paging message to page the UEs 102 in the second group using paging identifiers instead of the bitmap. As a non-limiting example, the eNB 104 may page a small number of UEs 102 in the second group, and a combined length of paging identifiers for those UEs 102 in the second group may be less than the length of the bitmap. For instance, a bitmap of 150 bits may be configured to page up to 150 UEs 102. When two UEs 102 of the 150 candidate UEs 102 are to be paged by the paging message, the combined length of S-TMSI identifiers for the two UEs 102 may be 80 bits, which is less than the 150 bits of the bitmap. In this case, it may be more efficient for the eNB 104 to exclude the bitmap and to include paging identifiers for the paged UEs 102 in the second group. The eNB 104 may also indicate, in the paging message, that the bitmap is excluded. For instance, a bitmap usage indicator may be excluded from the paging message or may be set to a predetermined value, such as 0.

As another example, when five UEs 102 in the second group of 150 UEs 102 are to be paged, the combined length of S-TMSI identifiers for those five UEs 102 may be 200 bits. In this case, it may be more efficient for the eNB 104 to include the bitmap and to exclude paging identifiers for the paged UEs 102 in the second group. The eNB 104 may also indicate, in the paging message, that the bitmap is included. For instance, a bitmap usage indicator may be included in the paging message and/or may be set to a predetermined value, such as 1.

As part of the determination of the format for the paging message, the eNB 104 may determine a combined length based on paging identifiers for a paging portion of the UEs 102 in the second group. For instance, the number of UEs 102 in the paging portion multiplied by the number of bits in the paging identifier (such as 40 or 64 or other) may be determined as an equivalent number of bits that would have to be used for paging of those UEs 102 via paging identifiers. The combined length may be compared to a length of the bitmap.

In some embodiments, when the length of the bitmap is less than the combined length, the paging message may include the bitmap and may exclude paging identifiers for the UEs 102 in the paging portion of the second group. When the length of the bitmap is not less than the combined length, the paging message may exclude the bitmap and may include paging identifiers for the UEs 102 in the paging portion of the second group.

In some embodiments, the decision of which format to be used for the paging message may be based on a threshold. As an example, the bitmap may be used when the combined length exceeds a predetermined threshold given in terms of a number of bits. The threshold may be related to the bitmap length, in some cases, but is not limited as such. As another example, the bitmap may be excluded when the length of the bitmap exceeds the combined length by at least a predetermined threshold.

As a non-limiting example, the first group of UEs 102 to which the eNB 104 may include legacy UEs 102. Accordingly, the legacy UEs 102 may be configured to determine a paging by the eNB 104 according to paging identifiers included in a paging record of the paging message. The second group of UEs 102 may include non-legacy UEs 102 that may be configured to determine the paging by the eNB 104 according to the bitmap and/or the paging identifiers.

As another example, one or more of the second group of UEs 102 may be configured to operate according to a Machine Type Communication (MTC) protocol or an Internet of Things (IoT) protocol. As part of such operation, the UEs 102 may exchange small quantities of data with the eNB 104 (or other device) at relatively infrequent rates. For instance, data blocks that include 100 bytes or fewer may be transmitted to the eNB 104 at a frequency of less than once per minute. The block size is not limited to 100 bytes, however, as other block sizes such as 20, 50, 200, 1000 or other number of bytes may be used in some cases. The frequency of transmission is also not limited to less than once per minute, as other frequency transmissions such as less than once per second, ten seconds, two minutes, ten minutes, one hour, one day or other period may be used in some cases.

In some cases, a large number of such MTC or IoT devices may be in operation, and may receive pages from the eNB 104 at an infrequent rate. Accordingly, it may be beneficial for the eNB 104 to have flexibility to dynamically select a paging message format (such as those described previously) based on the number of UEs 102 (or other devices) to be paged at a particular time.

At operation 435, one or more random access messages may be received from at least a portion the UEs 102 indicated in the paging message (or paged by the paging message). In some embodiments, the random access messages may be transmitted by the UEs 102 based on reception of the paging message. That is, the UEs 102 indicated in the paging message may respond by initiating and/or performing a random access procedure with the eNB 104. In some cases, the eNB 104 may also transmit one or more random access messages to the UE 102 as part of the random access procedure.

At operation 440, the eNB 104 may transmit downlink data to at least a portion of the UEs 102 indicated in the paging message. In some embodiments, the data may be transmitted according to a data connection established at least partly by the random access procedure. These embodiments are not limiting, however, as the eNB 104 may transmit the downlink data without performance of the random access procedure in some embodiments. That is, some embodiments of the method 400 may exclude operation 435.

Figure 6:
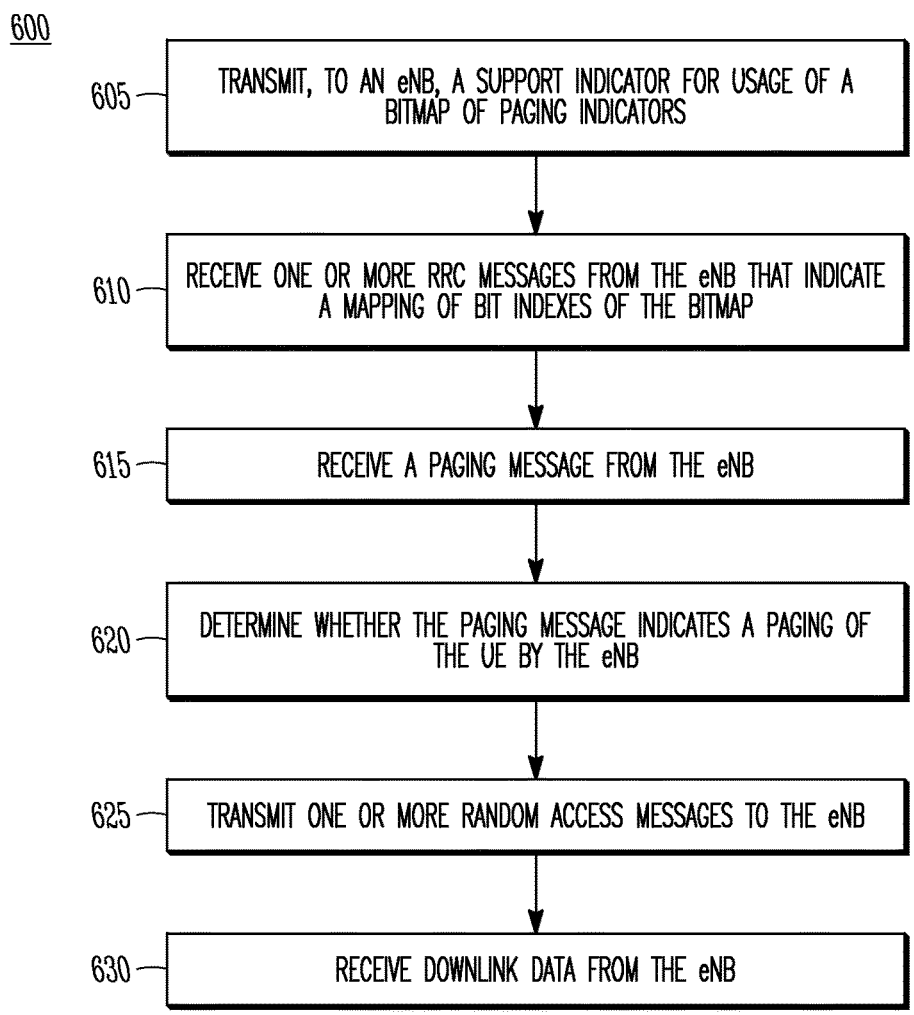
FIG. 6 illustrates the operation of another method of paging in accordance with some embodiments.

FIG. 6 illustrates the operation of another method of paging in accordance with some embodiments. As mentioned previously regarding the method 400, embodiments of the method 600 may include additional or even fewer operations or processes in comparison to what is illustrated in FIG. 6 and embodiments of the method 600 are not necessarily limited to the chronological order that is shown in FIG. 6. In describing the method 600, reference may be made to FIGS. 1-5 and 7-9, although it is understood that the method 600 may be practiced with any other suitable systems, interfaces and components. In addition, techniques and concepts described herein may be applicable to the method 600 in some cases, including the paging message, bitmap of paging indicators, paging identifiers, paging opportunity, RRC signaling, random access procedure and/or others.

It should be noted that the method 600 may be practiced at the UE 102, and may include exchanging of signals or messages with the eNB 104. Similarly, the method 400 may be practiced at the eNB 104, and may include exchanging of signals or messages with the UE 102. In some cases, operations and/or techniques described as part of the method 400 may be relevant to the method 600. For instance, an operation of the method 400 may include transmission of a message by the eNB 104 while an operation of the method 600 may include reception of the same message or similar message at the UE 102.

At operation 605 of the method 600, the UE 102 may transmit, to an eNB 104, a support indicator for usage of a bitmap of paging indicators as part of a paging process. That is, the eNB 104 may be configured to page UEs 102 using paging identifiers and/or the bitmap, and the UE 102 may indicate whether or not it supports the use of the bitmap. The support indicator may be transmitted as part of one or more radio resource control (RRC) messages, although embodiments are not so limited, and other control messages may be used in some cases.

At operation 610, the UE 102 may receive one or more RRC messages from the eNB 104 that may indicate a mapping of bit indexes of the bitmap. In some embodiments, the mapping may be provided to the UE 102 when the eNB 104 is notified that the UE 102 supports usage of the bitmap.

At operation 615, the UE 102 may receive, from the eNB 104, a paging message for paging of one or more UEs 102 to which the eNB 104 intends to send downlink data. Although various techniques related to the paging message described herein may be used at operation 615, embodiments are not so limited. As an example, the paging message may include paging identifiers for at least a first portion of the paged UEs 102. The paging message may also include, in some cases, a bitmap of paging indicators that may enable the eNB 104 to page a group of UEs 102 assigned to bit indexes of the bitmap. A second portion of the paged UEs 102 may be included in the group of UEs 102 assigned to the bit indexes.

At operation 620, the UE 102 may determine whether the paging message indicates a paging of the UE 102 by the eNB 104. In some cases, the paging message may include the bitmap and may use it for paging of the UE 102. In some cases, a paging identifier for the UE 102 may be included in the paging message (as part of a paging list or otherwise) for paging of the UE 102. Accordingly, a bitmap usage indicator may be included in the paging message to indicate to the UE 102 whether or not the bitmap is included. As an example, when the bitmap of paging indicators is included, the UE 102 may determine whether or not it is being paged by looking at the particular paging indicator assigned to the UE 102. When the bitmap of paging indicators is excluded, the UE 102 may determine whether or not it is being paged by looking for its paging identifier in the paging list or elsewhere within the paging message.

At operation 625, one or more random access messages may be transmitted by the UE 102. In some embodiments, the random access messages may be transmitted by the UE 102 based on reception of the paging message. That is, when the UE 102 is paged by the paging message, it may respond by initiating and/or performing a random access procedure with the eNB 104. In some cases, the UE 102 may receive one or more random access messages from the eNB 104 as part of the random access procedure.

At operation 630, the UE 102 may receive downlink data from the eNB 104. In some embodiments, the data may be transmitted according to a data connection established at least partly by the random access procedure. These embodiments are not limiting, however, as the eNB 104 may transmit the downlink data without performance of the random access procedure in some embodiments. That is, some embodiments of the method 600 may exclude operation 625.

Figure 7:
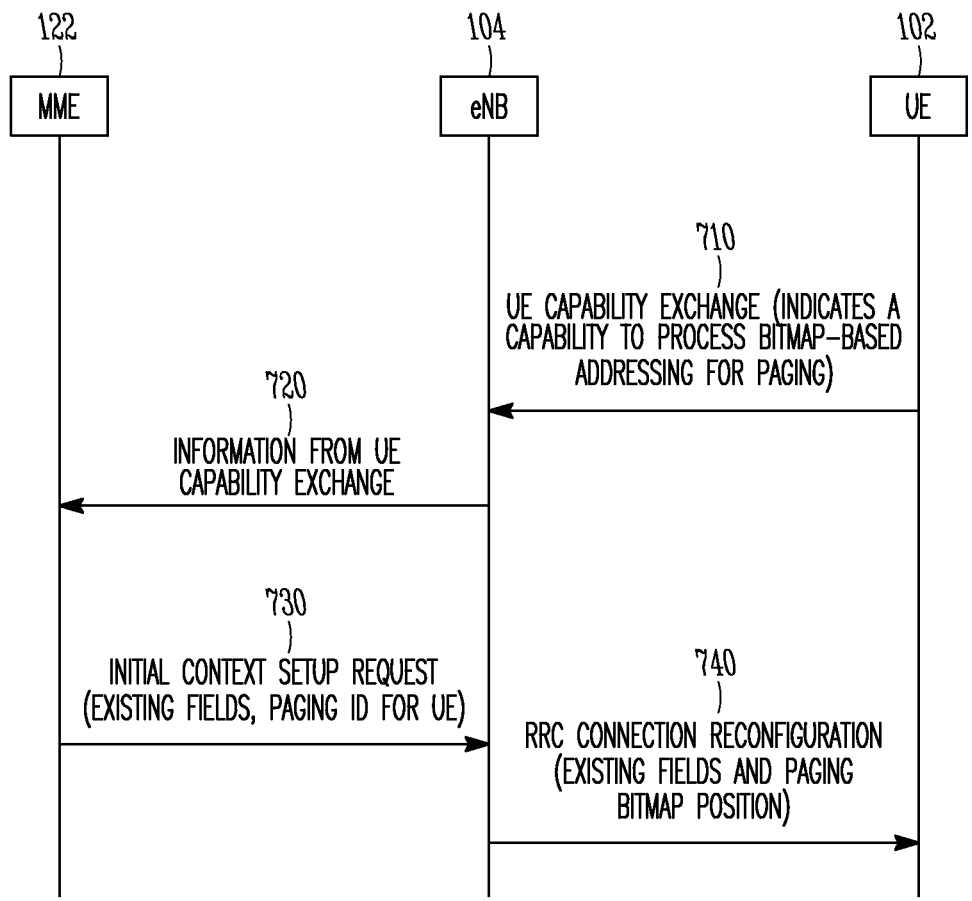
FIG. 7 illustrates the operation of another method of paging in accordance with some embodiments.
Figure 8:
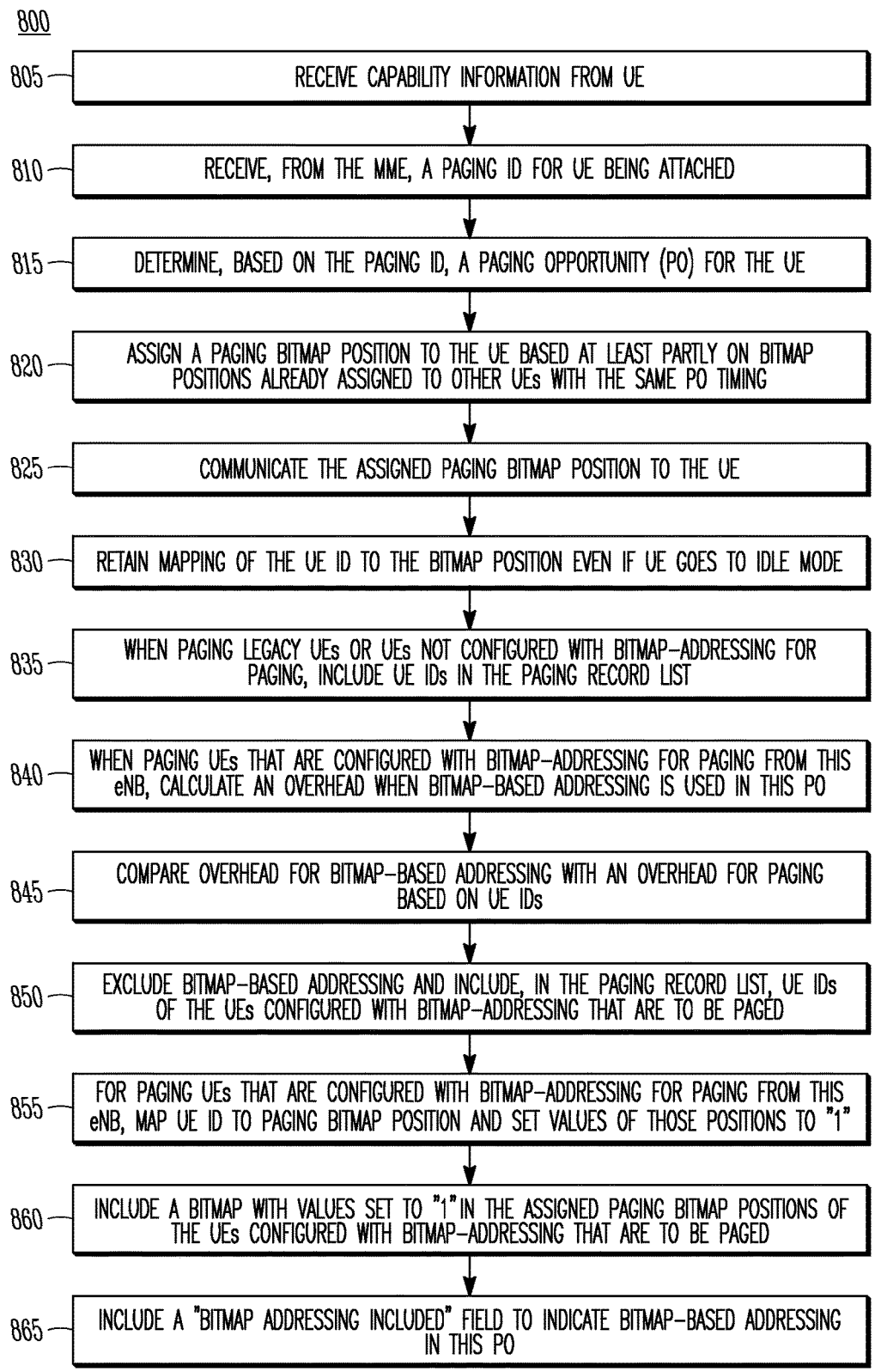
FIG. 8 illustrates the operation of another method of paging in accordance with some embodiments.
Figure 9:
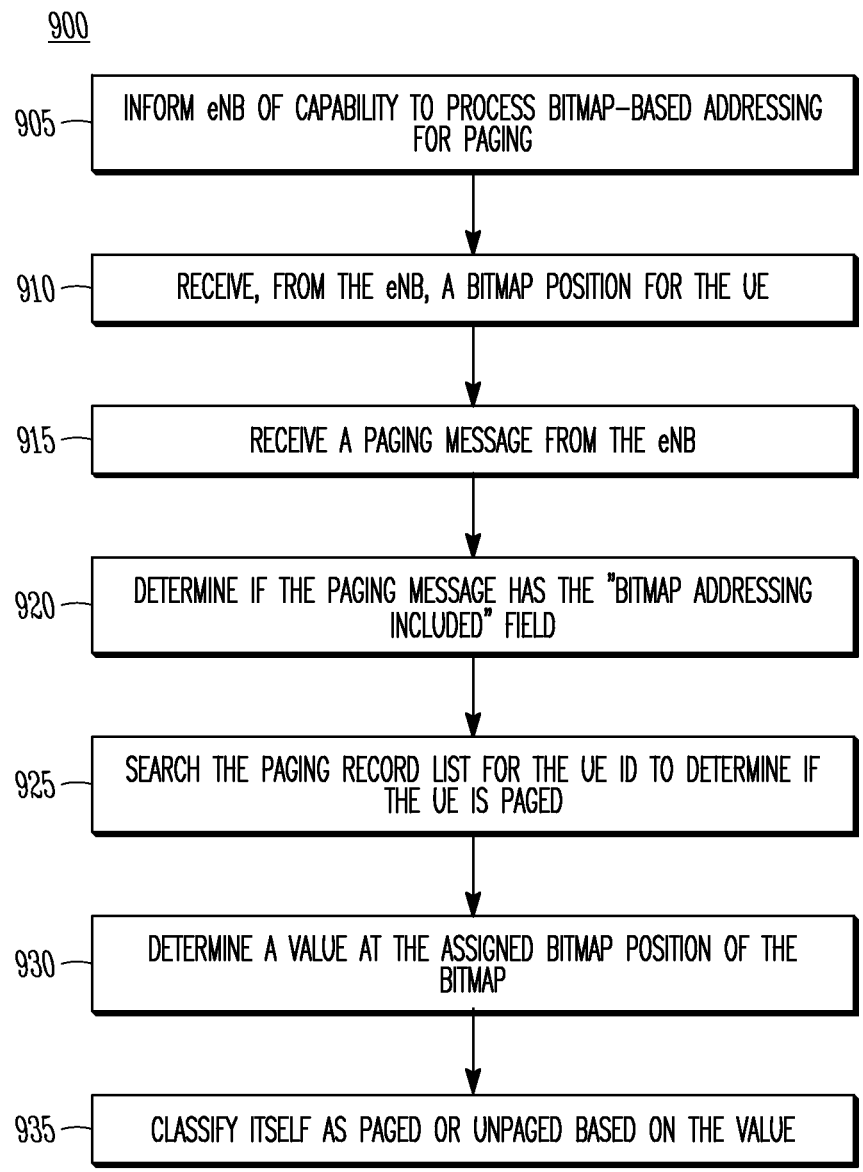
FIG. 9 illustrates the operation of another method of paging in accordance with some embodiments.

FIG. 7 illustrates the operation of another method of paging in accordance with some embodiments. FIG. 8 illustrates the operation of another method of paging in accordance with some embodiments. FIG. 9 illustrates the operation of another method of paging in accordance with some embodiments. In some cases, techniques and concepts described herein may be applicable to some embodiments of methods 700, 800 and/or 900, including the paging message, bitmap of paging indicators, paging identifiers, paging opportunity, RRC signaling, random access procedure and/or others. In addition, some embodiments of the methods 700, 800, and/or 900 may include fewer or additional operations than what is shown in FIGS. 7-9. The chronological order of operations is also not limited to that shown in FIGS. 7-9. Some embodiments may include one or more operations from one or more of the methods 400, 600, 700, 800, and/or 900 and may also include other operations in some cases.

The method 700 may include operations that may be performed at the UE 102, eNB 104 and/or MME 122, but embodiments are not limited to these devices. At operation 710 of the method 700, the UE 102 may transmit a capability indicator that may indicate whether or not the UE 102 has the capability to process bitmap-based addressing as part of a paging process. The capability indicator may be received at the eNB 104. As an example, the capability indicator may be communicated using operations and/or messages included in a "UE capability exchange" process that may be included in 3GPP or other standards. Embodiments are not limited as such, however.

At operation 720, the eNB 104 may transmit information to the MME 122 as part of one or more messages. The information may include the capability indicator from operation 710 or may be based on the capability indicator. Accordingly, the eNB 104 may inform the MME 122 whether or not the UE 102 supports the bitmap-based addressing. Other information may also be transmitted to the MME 122 as part of operation 720.

At operation 730, the MME 122 may transmit a paging identifier for the UE 102, which may be received at the eNB 104. The paging identifier may be included in one or more messages that may or may not include other information. In some cases, the transmission may be performed in response to a reception of the capability indicator from the eNB 104 at operation 720, although embodiments are not limited as such. The paging identifier may be or may include an S-TMSI or IMSI or other identifier. As an example, the paging identifier may be communicated using operations and/or messages included in an "Initial Context Setup Request" process that may be included in 3GPP or other standards. Embodiments are not limited as such, however.

At operation 740, the eNB 104 may transmit a paging bitmap position, which may be received at the UE 102. The paging bitmap position may be included in one or more messages that may or may not include other information. The paging bitmap position may be determined at the eNB 104 and may be based at least partly on the paging identifier for the UE 102. As an example, the paging bitmap position may be communicated using operations and/or messages included in an "RRC Connection Reconfiguration" process that may be included in 3GPP or other standards. Embodiments are not limited as such, however.

The method 800 may include operations that may be performed at the eNB 104 and/or a base station, but embodiments are not limited to these devices. At operation 805 of the method 800, the eNB 104 may receive capability information from the UE 102 related to whether the UE 102 is capable of using bitmap-based addressing for paging. As a non-limiting example, the operation 805 may be performed during an initial attach process of the UE 102. At operation 810, a paging identifier (ID) may be received from the MME 122 for the UE 102. The paging ID may be included in an Initial Context Setup message, although embodiments are not limited as such. When the eNB 104 has access to the paging ID for the UE 102 during the initial attach process, the eNB 104 may be able to put UEs 102 that belong to a same paging opportunity (PO) to a common bitmap for the PO. At operation 815, the eNB may determine a PO for the UE 102 based at least partly on the paging ID for the UE 102. At operation 820, the eNB 104 may determine and/or assign a paging bitmap position to the UE 102 based at least partly on bitmap positions already assigned to other UEs 102 with the same PO timing. That is, an unassigned bit position may be assigned to the UE 102. At operation 825, the eNB 104 may communicate the assigned paging bitmap position to the UE 102 using RRC signaling and/or other messages. Although not limited as such, one or more of operations 805-825 may be performed during the initial attach process of the UE 102, and may be performed when the UE 102 is capable of bitmap-based addressing for paging.

At operation 830, the eNB 104 may retain the mapping between bitmap positions and paging IDs of UEs 102 that have been configured for bitmap-based addressing for paging. That is, the eNB 104 may continue to use and/or reserve a particular bitmap position for paging of the UE 102 and may refrain from assigning that bitmap position to other UEs 102. As an example, the eNB 104 may retain the mapping even when one or more UEs 102 enters an idle mode.

At operation 835, when paging legacy UEs 102 or paging UEs 102 not configured with bitmap-addressing for paging, the eNB 104 may include UE IDs (paging IDs) in the paging record list. This form of paging may be considered legacy behavior in some cases. At operation 840, when one or more UEs 102 configured with bitmap-addressing for paging from this eNB 104 are to be paged, the eNB 104 may calculate an overhead related to bitmap-based addressing. As an example, a length of the bitmap may be determined. It should be noted that, in some embodiments, the eNB 104 may not necessarily perform the overhead calculation when no UEs 102 configured with bitmap-based addressing are to be paged.

At operation 845, the overhead related to bitmap-based addressing may be compared to an overhead for paging based on usage of paging IDs for the UEs 102 that would be paged by the bitmap. Based on the comparison, the eNB 104 may determine whether to use the bitmap-based addressing or to include paging IDs. At operation 850, when it is determined that the bitmap-based addressing does not provide a benefit in terms of overhead, bitmap-based addressing may be excluded. In addition, paging IDs for the UEs 102 that are assigned bitmap positions and are to be paged may be included in the paging record list. At operations 855 and 860, when it is determined that the bitmap-based addressing may provide an overhead benefit, the bitmap may be included in the paging message and the appropriate bitmap positions for those UEs 102 may be determined and may be set to "1" in the bitmap. Accordingly, the eNB 104 may exclude paging IDs of those UEs 102 from the paging record list (and therefore from the paging message). In addition, at operation 865, when it is determined that the bitmap-based addressing may provide an overhead benefit, a "bitmap addressing included" field may be included in the paging message to indicate usage of bitmap-based addressing and/or inclusion of a bitmap.

Although not limited as such, one or more of operations 835-865 may be performed during a paging opportunity (PO), and may be performed during a PO in which one or more UEs 102 are configured to process bitmap-based addressing for paging.

The method 900 may include operations that may be performed at the UE 102 and/or a mobile device, but embodiments are not limited to these devices. At operation 905 of the method 900, the UE 102 may inform the eNB 104 of a capability to process bitmap-based addressing for paging. For instance, the capability may indicate whether or not the UE 102 is configured to or capable of processing bitmap-based addressing. At operation 910, the UE 102 may receive, from the eNB 104, a bitmap position for paging of the UE 102. Although not limited as such, operations 905 and/or 910 may be performed during the initial attach process of the UE 102, and may be performed when the UE 102 is capable of bitmap-based addressing for paging.

At operation 915, the UE 102 may receive a paging message from the eNB 104. At operation 920, the UE 102 may determine if the paging message has the "bitmap addressing included" field, which may indicate whether or not the paging message includes a bitmap. At operation 925, when the UE 102 determines that the paging message does not include the bitmap, the UE 102 may search the paging record list for a paging identifier of the UE 102 to determine if the UE 102 is paged by the paging message. If the UE 102 finds its paging ID in the paging record list, the UE 102 may classify itself or consider itself as being paged by the paging message. In addition, if the UE 102 does not find its paging ID in the paging record list, the UE 102 may classify itself or consider itself as being unpaged or not paged by the paging message. At operation 930, when the UE 102 determines that the paging message includes the bitmap, the UE 102 may determine a paging indicator value at the bitmap position that is assigned to the UE 102. At operation 935, the UE 102 may classify itself as paged or not paged based on the value of the paging indicator for the UE 102.

Although not limited as such, one or more of operations 915-935 may be performed during a paging opportunity (PO), and may be performed when the UE 102 is configured to process bitmap-based addressing for paging. It should also be noted that, in some cases, the UE 102 may be configured to process the bitmap-based addressing but may not have been assigned a bitmap position. In such cases, the UE 102 may perform operation 925. That is, the UE 102 may search the paging record list for a paging identifier of the UE 102 to determine if the UE 102 is paged by the paging message. Accordingly, the UE 102 may perform some operations according to legacy behavior when it has not been assigned a bitmap position, even though it may be capable of bitmap-based processing. In such cases, the UE 102 may also perform operation 920 in which it determines whether or not the paging message includes the bitmap.

As an example, the UE 102 may be configured to operate according to bitmap-based addressing with a first eNB 104, and may move to or may be handed off to a second eNB 104 during an idle mode. In such cases, one or more of the following operations may be performed. The second eNB 104 may use paging according to paging IDs for the UE 102 during a time period, such as an initial period after the handoff. The second eNB 104 may exchange control or setup messages, such as RRC signaling or other, with the UE 102 to configure bitmap-based paging for the UE 102. As an example, the RRC signaling may be part of an "RRC Connection Setup/Reconfiguration" or similar process, but embodiments are not limited as such. Accordingly, the second eNB 104 may learn or be notified of a capability of the UE 102 to operate according to bitmap-based addressing for paging. The second eNB 104 may request and/or receive a paging ID for the UE 102 from the MME 122 in such cases, and may use previous techniques to determine a paging opportunity (PO) for the UE 102 and to assign the UE 102 a bitmap position. In some embodiments, additional operations may be performed by the second eNB 104 and/or the UE 102, including but not limited to operations included in the methods 800 and 900.

As another example, the UE 102 may be handed off from a source eNB 104 to a target eNB 104 while in a connected mode. In some cases, the UE 102 may be configured to operate according to bitmap-based addressing with the source eNB 104, and one or more of the following operations may be performed. The source eNB 104 may inform the target eNB 104 whether or not the UE is capable of or configured to operate according to the bitmap-based addressing for paging. The target eNB 104 may request and/or receive a paging ID for the UE 102 from the MME 122 in such cases, and may use previous techniques to determine a paging opportunity (PO) for the UE 102 and to assign the UE 102 a bitmap position. In some embodiments, additional operations may be performed by the target eNB 104 and/or the UE 102, including but not limited to operations included in the methods 800 and 900.

An example of an apparatus for an Evolved Node-B (eNB) is disclosed herein. The apparatus may comprise transceiver circuitry and hardware processing circuitry. The hardware processing circuitry may configure the transceiver circuitry to transmit a paging message that includes paging identifiers for a first group of one or more User Equipments (UEs) to indicate an intention of the eNB to send downlink data to the first group of UEs. The paging message may further include a bitmap of paging indicators to indicate whether the eNB intends to send downlink data to a second group of UEs. The paging indicators may be mapped to the second group of UEs according to bit indexes of the bitmap.

In some examples, the paging message may include the bitmap when a length of the bitmap is less than a combined length. The combined length may be based on paging identifiers for a paging portion of the UEs in the second group of UEs to which the eNB intends to send downlink data. In some examples, when the length of the bitmap is not less than the combined length, the paging message may exclude the bitmap and may further include paging identifiers for the paging portion of the UEs.

In some examples, the hardware processing circuitry may further configure the transceiver circuitry to receive, from a mobility management entity (MME), paging identifiers for the second group of UEs. The hardware processing circuitry may be configured to determine the mapping of the paging indicators to the second group of UEs based at least partly on the paging identifiers for the second group of UEs. In some examples, the hardware processing circuitry may further configure the transceiver circuitry to receive, from the second group of UEs, support indicators for operation according to the bitmap of paging indicators. The hardware processing circuitry may further configure the transceiver circuitry to transmit, to the MME, one or more requests for the paging identifiers for the second group of UEs.

In some examples, the hardware processing circuitry may further configure the transceiver circuitry to receive, from the second group of UEs, support indicators for operation according to the bitmap of paging indicators. The hardware processing circuitry may be configured to determine the mapping of the paging indicators to the second group of UEs based at least partly on the support indicators. In some examples, the support indicators may be received in one or more radio resource control (RRC) messages. The hardware processing circuitry may further configure the transceiver circuitry to transmit, to the second group of UEs, one or more RRC messages that indicate the mapping.

In some examples, the paging message may be for a transmission period during which the downlink data is to be sent to the first group of UEs and to a paging portion of the second group of UEs. In some examples, the paging message may exclude paging identifiers for the second group of UEs. In some examples, the paging identifiers may include a temporary mobile subscriber identity (TMSI) or an international mobile subscriber identity (IMSI). In some examples, one or more UEs in the second group of UEs may be configured to operate according to a Machine Type Communication (MTC) protocol.

In some examples, the first group of UEs may include one or more legacy UEs and the second group of UEs may include one or more non-legacy UEs. In some examples, the eNB and the first and second groups of UEs may be configured to operate in a Third Generation Partnership Project (3GPP) network. In some examples, the apparatus may further comprise one or more antennas coupled to the transceiver circuitry for the transmission of the paging message.

An example of a non-transitory computer-readable storage medium that stores instructions for execution by one or more processors to perform operations for paging by an Evolved Node-B (eNB) is also disclosed herein. The operations may configure the one or more processors to receive, from a first User Equipment (UE), a radio resource control (RRC) message that indicates whether the first UE supports usage of a bitmap of paging indicators as part of the paging. The operations may further configure the one or more processors to transmit a paging message that includes the bitmap and further includes a paging identifier for a second UE to be paged by the eNB. Bit indexes of the bitmap may be mapped to a group of UEs. The paging indicators may indicate whether UEs in the group of UEs are to be paged by the eNB. The group of UEs may include the first UE and may exclude the second UE.

In some examples, the group of UEs may include the first UE when the first UE supports the usage of the bitmap of paging indicators as part of the paging. In some examples, the operations may further configure the one or more processors to determine a combined length based on paging identifiers for a paging portion of the UEs in the group of UEs that are to be paged by the eNB. The paging message may include the bitmap when the combined length is greater than a predetermined threshold that is based on a length of the bitmap. In some examples, when the combined length is not greater than the predetermined threshold, the paging message may exclude the bitmap and may include paging identifiers for the paging portion of the UEs.

In some examples, the operations may further configure the one or more processors to receive, from a mobility management entity (MME), paging identifiers for the group of UEs. The operations may further configure the one or more processors to determine the mapping of the paging indicators to the group of UEs based at least partly on the paging identifiers for the group of UEs. The operations may further configure the one or more processors to transmit one or more radio resource control (RRC) messages to the group of UEs to indicate the mapping.

An example of a method of paging performed by an Evolved Node-B (eNB) is also disclosed herein. The method may comprise transmitting a paging message that includes paging identifiers for a first group of one or more User Equipments (UEs) to indicate an intention of the eNB to send downlink data to the first group of UEs. The paging message may further include a bitmap of paging indicators to indicate whether the eNB intends to send downlink data to a second group of UEs. The paging indicators may be mapped to the second group of UEs according to bit indexes of the bitmap. In some examples, the paging message may include the bitmap when a length of the bitmap is less than a combined length that is based on paging identifiers for a paging portion of the UEs in the second group of UEs to which the eNB intends to send downlink data. When the length of the bitmap is not less than the combined length, the paging message may exclude the bitmap and may further include paging identifiers for the paging portion of the UEs.

An example of an apparatus for a User Equipment (UE) is also disclosed herein. The apparatus may comprise transceiver circuitry and hardware processing circuitry. The hardware processing circuitry may configure the transceiver circuitry to receive, from an Evolved Node-B (eNB), a paging message for paging of one or more UEs to which the eNB intends to send downlink data. The hardware processing circuitry may further configure the transceiver circuitry to transmit, when the UE is paged by the paging message, one or more random access messages for establishment of a downlink data connection with the eNB. The paging message may include paging identifiers for at least a first portion of the paged UEs. The paging message may include a bitmap of paging indicators that indicate whether the eNB intends to send downlink data to a group of UEs assigned to bit indexes of the bitmap. At least a second portion of the paged UEs may be included in the group of UEs assigned to the bit indexes of the bitmap.

In some examples, the paging message may include the bitmap of paging indicators when a combined length of paging identifiers for the second portion of the paged UEs is greater than a length of the bitmap. The paging message may further include a bitmap usage indicator of whether the bitmap of paging indicators is included in the paging message. The hardware processing circuitry may be configured to determine whether the UE is paged by the paging message based at least partly on the bitmap usage indicator. In some examples, the UE may be configured to operate according to a Machine Type Communication (MTC) protocol. In some examples, the apparatus may further comprise one or more antennas coupled to the transceiver circuitry for the reception of the paging message and the transmission of the random access messages.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an Evolved Node-B (eNB), the apparatus comprising transceiver circuitry and hardware processing circuitry, the hardware processing circuitry to configure the transceiver circuitry to:
   transmit a paging message that includes paging identifiers for a first group of one or more User Equipments (UEs) to indicate an intention of the eNB to send downlink data to the first group of UEs,
   wherein the paging message further includes a bitmap of paging indicators to indicate whether the eNB intends to send downlink data to a second group of UEs when a length of the bitmap is less than a combined length, the combined length based on paging identifiers for a paging portion of the UEs in the second group of UEs to which the eNB intends to send downlink data, and when the length of the bitmap is not less than the combined length, the paging message excludes the bitmap and further includes paging identifiers for the paging portion of the UEs, and
   wherein the paging indicators are mapped to the second group of UEs according to bit indexes of the bitmap such that each bit index corresponds to a different UE in the second group of UEs.

2. The apparatus according to claim 1, wherein:
   the hardware processing circuitry is to further configure the transceiver circuitry to receive, from a mobility management entity (MME), paging identifiers for the second group of UEs; and
   the hardware processing circuitry is configured to determine the mapping of the paging indicators to the second group of UEs based at least partly on the paging identifiers for the second group of UEs.

3. The apparatus according to claim 2, the hardware processing circuitry to further configure the transceiver circuitry to:
   receive, from the second group of UEs, support indicators for operation according to the bitmap of paging indicators, and
   in response to reception of the support indicators, transmit, to the MME, one or more requests for the paging identifiers for the second group of UEs.

4. The apparatus according to claim 1, wherein:
   the hardware processing circuitry is to further configure the transceiver circuitry to receive, from the second group of UEs, support indicators for operation according to the bitmap of paging indicators, and
   the hardware processing circuitry is configured to determine the mapping of the paging indicators to the second group of UEs based at least partly on the support indicators.

5. The apparatus according to claim 4, wherein:
   the support indicators are received in one or more radio resource control (RRC) messages, and
   the hardware processing circuitry is to further configure the transceiver circuitry to transmit, to the second group of UEs, one or more RRC messages that indicate the mapping.

6. The apparatus according to claim 1, wherein the paging message is for a transmission period during which the downlink data is to be sent to the first group of UEs and to a paging portion of the second group of UEs.

7. The apparatus according to claim 1, wherein the paging message excludes paging identifiers for the second group of UEs.

8. The apparatus according to claim 1, wherein the paging identifiers include a temporary mobile subscriber identity (TMSI) or an international mobile subscriber identity (IMSI).

9. The apparatus according to claim 1, wherein one or more UEs in the second group of UEs are configured to operate according to a Machine Type Communication (MTC) protocol.

10. The apparatus according to claim 1, wherein the first group of UEs includes one or more legacy UEs and the second group of UEs includes one or more non-legacy UEs.

11. The apparatus according to claim 1, wherein the eNB and the first and second groups of UEs are configured to operate in a Third Generation Partnership Project (3GPP) network.

12. The apparatus according to claim 1, the apparatus further comprising one or more antennas coupled to the transceiver circuitry for the transmission of the paging message.

13. The apparatus according to claim 1, wherein each bit index is selected from a binary value and indicates whether a particular UE associated with the bit index is paged by the paging message.

14. A non-transitory computer-readable storage medium that stores instructions for execution by one or more processors to perform operations for paging by an Evolved Node-B (eNB), the operations to configure the one or more processors to:
receive, from a first User Equipment (UE), a radio resource control (RRC) message that indicates whether the first UE supports usage of a bitmap of paging indicators as part of the paging;
determine a combined length based on paging identifiers for a paging portion of UEs in a group of UEs that are to be paged by the eNB; and
transmit a paging message that includes the bitmap and further includes a paging identifier for a second UE to be paged by the eNB when the combined length is determined to be greater than a predetermined threshold that is based on a length of the bitmap and when the combined length is not greater than the predetermined threshold, the paging message excludes the bitmap and includes paging identifiers for the paging portion of the UEs,
wherein bit indexes of the bitmap are mapped to the group of UEs such that each bit index corresponds to a different UE in the group of UEs,
wherein the paging indicators indicate whether UEs in the group of UEs are to be paged by the eNB,
wherein the group of UEs includes the first UE and excludes the second UE.

15. The non-transitory computer-readable storage medium according to claim 14, wherein the group of UEs includes the first UE when the first UE supports the usage of the bitmap of paging indicators as part of the paging.

16. The non-transitory computer-readable storage medium according to claim 14, the operations to further configure the one or more processors to:
receive, from a mobility management entity (MME), paging identifiers for the group of UEs;
determine the mapping of the paging indicators to the group of UEs based at least partly on the paging identifiers for the group of UEs; and
transmit one or more radio resource control (RRC) messages to the group of UEs to indicate the mapping.

17. An apparatus for a User Equipment (UE), the apparatus comprising transceiver circuitry and hardware processing circuitry, the hardware processing circuitry to configure the transceiver circuitry to:
receive, from an Evolved Node-B (eNB), a paging message for paging of one or more UEs to which the eNB intends to send downlink data; and
when the UE is paged by the paging message, transmit one or more random access messages for establishment of a downlink data connection with the eNB,
wherein the paging message includes paging identifiers for at least a first portion of the paged UEs,
wherein the paging message includes a bitmap of paging indicators that indicate whether the eNB intends to send downlink data to a group of UEs assigned to bit indexes of the bitmap such that each bit index corresponds to a different UE in the group of UEs when a length of the bitmap is less than a combined length, the combined length based on paging identifiers for a paging portion of the UEs in the second group of UEs to which the eNB intends to send downlink data and, when the length of the bitmap is not less than the combined length, the paging message excludes the bitmap and further includes paging identifiers for the paging portion of the UEs, and
wherein at least a second portion of the paged UEs are included in the group of UEs assigned to the bit indexes of the bitmap.

18. The apparatus according to claim 17, wherein:
the paging message includes the bitmap of paging indicators when a combined length of paging identifiers for the second portion of the paged UEs is greater than a length of the bitmap,
the paging message further includes a bitmap usage indicator of whether the bitmap of paging indicators is included in the paging message, and
the hardware processing circuitry is configured to determine whether the UE is paged by the paging message based at least partly on the bitmap usage indicator.

19. The apparatus according to claim 17, wherein the UE is configured to operate according to a Machine Type Communication (MTC) protocol.

20. The apparatus according to claim 17, the apparatus further comprising one or more antennas coupled to the transceiver circuitry for the reception of the paging message and the transmission of the random access messages.

21. An apparatus for an Evolved Node-B (eNB), the apparatus comprising:
an interface; and
processing circuitry in communication with transceiver circuitry through the interface, the processing circuitry configured to:
determine that a paging message is to be transmitted to first and second User Equipment (UE) groups;
calculate a combined length of paging identifiers for UEs in the second UE group combined together;
generate the paging message dependent on the combined length of paging identifiers for UEs in the second UE group, the paging message comprising paging identifiers for UEs in the first UE group and a bitmap indication of whether the paging message comprises a bitmap of the paging indicators for UEs in the second UE group, the bitmap comprising a mapping between bit indexes of the bitmap and the UEs in the second UE group such that each of a group of at least one bit index corresponds to a different UE in the second UE groups;

compare a length of the bitmap with the combined length of paging identifiers for the UEs in the second UE group;

in response to the length of the bitmap being less than the combined length of paging identifiers for the UEs in the second UE group, include the bitmap in the paging message and indicate, via the bitmap indication, that the paging message comprises the bitmap, and in response to the length of the bitmap being at least the combined length of the paging identifiers for the UEs in the second UE group, include the paging identifiers for the UEs in the second UE group in the paging message rather than the bitmap, and indicate, via the bitmap indication, that the paging message excludes the bitmap.

22. The apparatus according to claim 21, wherein the processing circuitry is further configured to:

create independent bitmaps for different paging opportunity (PO), a particular PO to which a particular UE belongs dependent on a paging identifier of the particular UE, an assigned paging bitmap position of the particular UE in a particular bitmap dependent on bitmap positions already assigned to other UEs having a same PO timing as the particular UE; and generate, for transmission to the particular UE, the assigned paging bitmap position in Radio Resource Control (RRC) signaling.

\* \* \* \* \*

UNITED STATES PATENT AND TRADEMARK OFFICE
CERTIFICATE OF CORRECTION

PATENT NO. : 9,955,453 B2
APPLICATION NO. : 14/834963
DATED : April 24, 2018
INVENTOR(S) : Rashid et al.

Page 1 of 1

It is certified that error appears in the above-identified patent and that said Letters Patent is hereby corrected as shown below:

In the Claims

In Column 25, Line 2, in Claim 21, delete "groups;" and insert --group;-- therefor Signed and Sealed this
Eleventh Day of June, 2019

Andrei Iancu
*Director of the United States Patent and Trademark Office*